Feb. 9, 1965   J. R. OISHEI   3,168,931
VEHICLE DOOR LOCKING SYSTEM
Filed Jan. 25, 1961   2 Sheets-Sheet 1
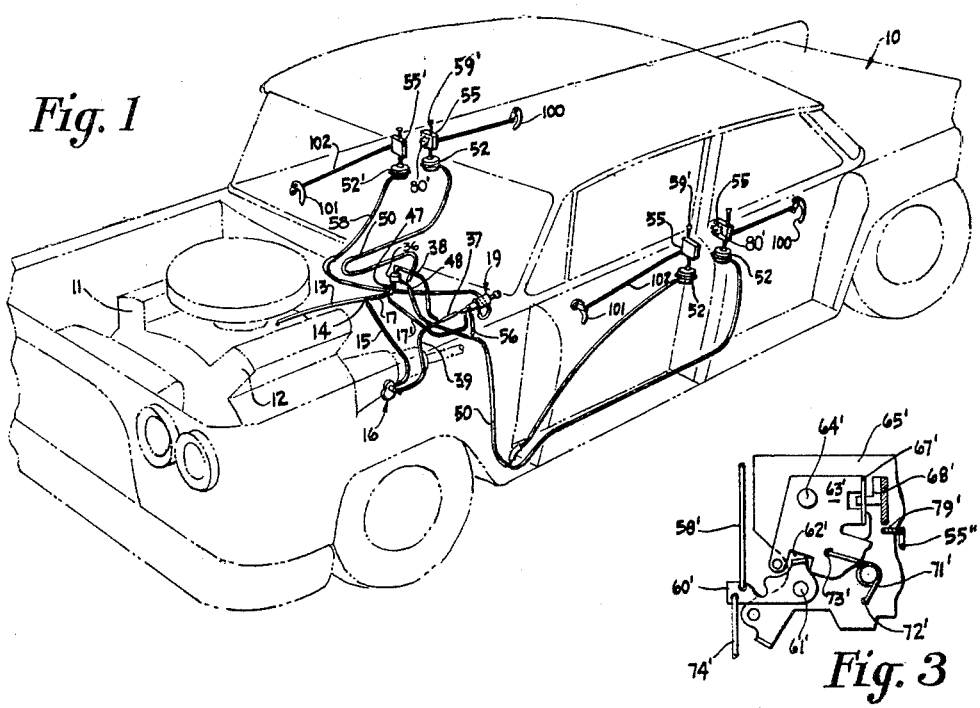
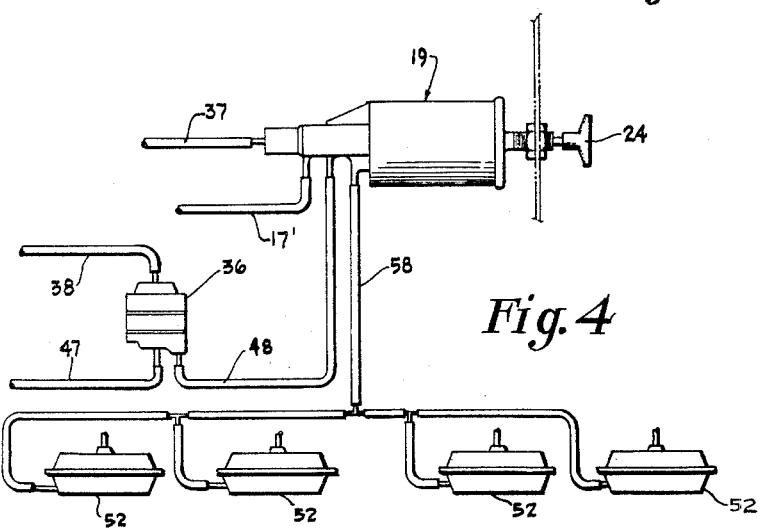
INVENTOR.
JOHN R. OISHEI
BY
Bean Brooks Buckley & Bean
ATTORNEYS

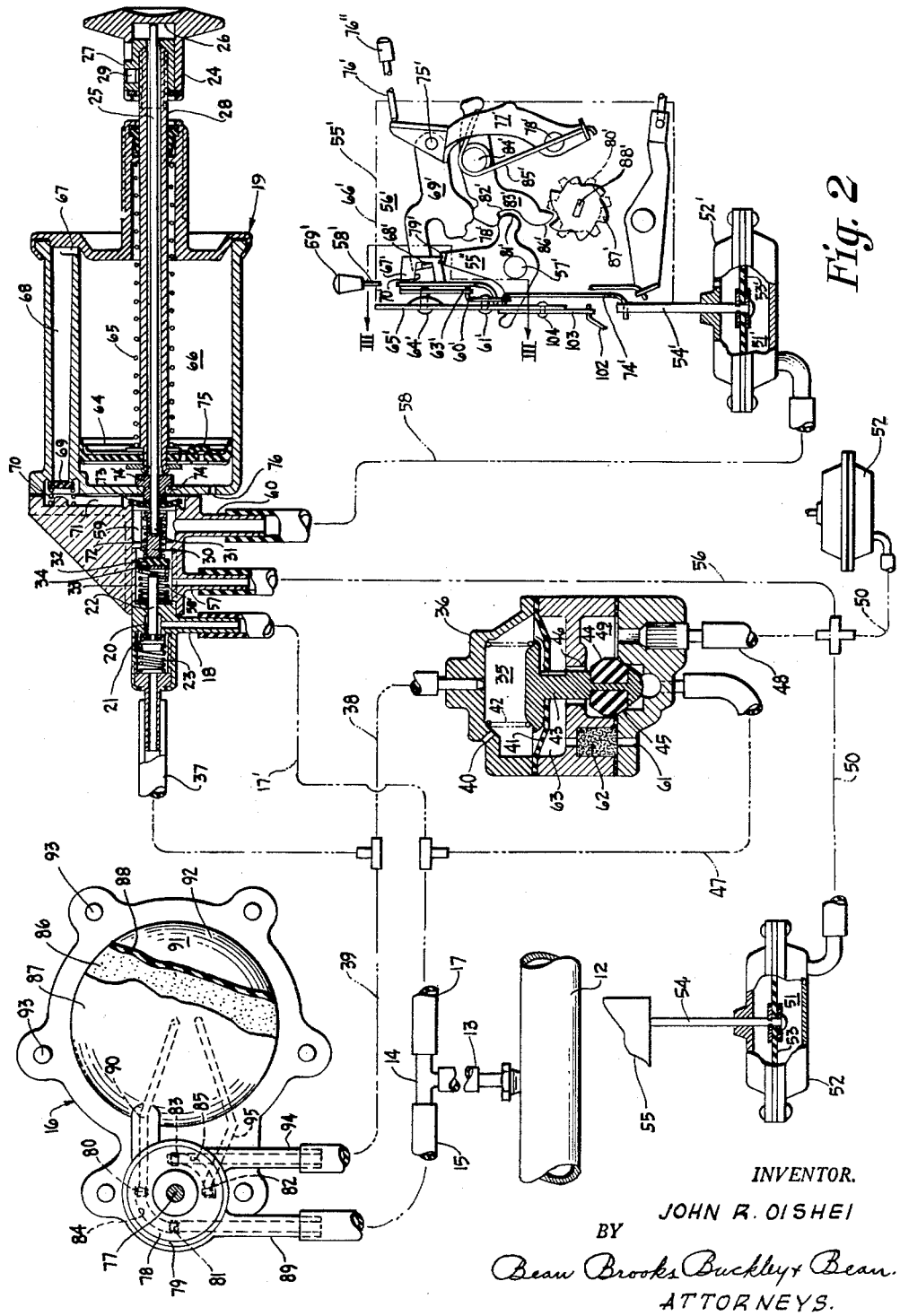

United States Patent Office 3,168,931
Patented Feb. 9, 1965

3,168,931
VEHICLE DOOR LOCKING SYSTEM
John R. Oishei, Buffalo, N.Y., assignor to Trico
Products Corporation, Buffalo, N.Y.
Filed Jan. 25, 1961, Ser. No. 84,935
8 Claims. (Cl. 180—82)

The present invention relates to an improved door locking system for an automotive vehicle.

It is the primary object of the present invention to provide a single control for a vehicle door locking system which, in combination with other components of the door locking system, provides automatic locking of all the vehicle doors when the vehicle is placed in motion, and also permits selective manual remote locking of all of the vehicle doors and manual remote unlocking of certain select doors in the vehicle when the vehicle is at a standstill.

It is another object of the present invention to provide a single control for a vehicle door locking system which, in addition to providing the above objectives, provides the manual remote unlocking without the requirement for a source of energy within the vehicle, thereby permitting a vehicle operator to effect remote unlocking of certain select vehicle doors, such as the front passenger's door, without any necessity for requiring the existence of or draining any energy source in the vehicle.

A still further object of the present invention is to provide a single control for a vehicle door locking system which also possesses the safety feature of positively preventing manual remote unlocking of any of the vehicle doors while the vehicle is in motion. Other objects and attendant advantages of the present invention will readily be perceived hereafter.

The single control of the present invention is incorporated into a system wherein the normal vehicle latch locks in the doors are coupled to fluid pressure motors. In the system, a source of fluid pressure is provided, such as the engine intake manifold. Conduit means are provided between this source of fluid pressure, in this instance vacuum, and the fluid pressure motors associated with each of the vehicle doors. These conduit means include only a single conduit connection to each of the fluid pressure motors. A control valve exists in the above-described conduit means and is responsive to the movement of the speedometer drive gear in the transmission to effect communication between the fluid pressure source and the door locking motors when the vehicle is moving. The foregoing communication actuates all of the door locking motors and causes them to automatically place the latch locks in a locked condition. Furthermore, as long as the vehicle is moving, the source of fluid pressure is maintained in communication with the lock actuating motors through the single conduits connected thereto to thereby maintain a holding force on the latch locks to prevent their accidental opening while the vehicle is in motion. When the vehicle is brought to a stop, the speedometer-drive responsive control terminates the communication between the vacuum source and the fluid pressure motors and also ultimately permits the fluid pressure motors to be vented through said single conduits, to thereby permit the vehicle doors to be unlatched from within the vehicle. However, the vehicle door latch locks are of such a construction that when the vehicle is brought to a stop and the fluid pressure motors are vented in the above-described manner, the latch locks will remain locked against unlocking from outside of the vehicle by the manipulation of the outside door handles.

Further in accordance with the present invention, the single control, which permits automatic locking as noted above, is also capable of effecting manual remote locking of all of the vehicle doors or manual remote unlocking of certain and preferably less than all of the vehicle doors. In this respect the manually actuable valve is designed so that when the control knob associated therewith is moved in a first direction, it will place the door locking motors in communication with said source of fluid pressure, namely the engine intake manifold. Thus all of the latch locks may be put in a locked condition by the vehicle operator, as described. A vacuum tank may be provided, if desired, to permit the foregoing to be achieved even after the engine has been shut off. On the other hand, if the vehicle operator desires to unlock the vehicle doors to permit a passenger to enter the vehicle, he need merely manipulate the above-mentioned control knob in a second direction. The control knob is connected to a fluid pressure pump and the manipulation of the control knob provides a positive fluid pressure which is opposite to the negative fluid pressure at said source, and the positive fluid pressure is conducted through a suitable valving arrangement in the single control to the above-mentioned single conduit in communication with one door locking motor. The positive pressure actuates the fluid pressure motor in an opposite direction than the negative pressure and therefore effects the unlocking of the latch lock through the single conduit in communication therewith. In the present instance, the door locking motor which is thus selectively remotely unlocked is in the front passenger's door. If desired, the arrangement can provide for unlocking both right passenger's doors or all the doors. The control is readily accessible to the vehicle operator from outside of the vehicle so that he can reach in and unlock the passenger's doors after he has opened his door but before he enters the vehicle. Furthermore, since the pump generates its own positive pressure whenever it is actuated, there need be no source of energy provided in the vehicle independently of the energy provided by the vehicle operator himself.

The valving arrangement in the single control which effects manual remote locking and unlocking of the vehicle doors is such that when the vehicle is in motion the doors cannot be unlocked by the actuation of the manual remote unlocking control. This is because the motor which can be remotely manually unlocked communicates with the vacuum source through the single control when the vehicle is moving, and the existence of vacuum in the control prevents the manual remote unlocking control from being effective to provide the pressure for unlocking the vehicle doors. Thus accidental remote unlocking is prevented under all circumstances, thereby obviating the possibility of accidental unlocking of the vehicle doors from a remote position while the vehicle is in motion. The present invention will be more fully understood when the following portions of the specification are read in conjunction with the accompanying drawings wherein:

FIG. 1 is a fragmentary perspective view of an automotive vehicle mounting the improved system of the present invention;

FIG. 2 is a schematic flow diagram showing the salient components of the door locking system and including certain of these components in cross section;

FIG. 3 is a view of the door locking mechanism taken along line III—III of FIG. 2; and FIG. 4 is a schematic representation of an alternate embodiment of the present invention.

In FIG. 1 an automobile vehicle 10 is shown having an engine 11 with the usual intake manifold 12 which provides a source of vacuum. A conduit 13 is in communication with the intake manifold. Conduit 15 is in communication with conduit 13 through T 14, and conduit 15 communicates with speedometer responsive control valve 16 (also see FIG. 2). Conduit 13 is also in communication with conduit 17 which is in communication with conduit 17' mounted on nipple 18 of manual remote control valve 19 which is mounted on the vehicle dashboard and is readily accessible from outside of the vehicle after the operator's door is opened.

After the vehicle engine has been started, the vacuum in conduit 17 will be transmitted to chamber 20 of control 19 through conduits 17 and 17'. However, when control 19 is in its normal deactuated condition, valve 21 mounted on pin 22 will be biased on its seat by spring 23 and thus the vacuum in conduit 17' will be dead ended in chamber 20. If it is desired to effect manual remote locking of all of the vehicle doors, it is merely necessary to push knob 24 to the left in FIG. 2. This will cause a corresponding movement to the left of pin 25, which is in abutting relationship with the inside 26 of knob 24, knob 24 being mounted for slidable movement on anchoring member 27 secured to stem 28 by set screw 29. The movement to the left of pin 25 will result in the movement of pin 30 to the left, pin 30 being loosely mounted on the end 31 of pin 25. The movement of pin 30 to the left will be accompanied by a corresponding movement of valve element 32 to the left against the bias of spring 33 until such time as metal washer 34 engages pin 22 and thus unseats valve 21 mounted thereon to permit the vacuum in chamber 20 to communicate with chamber 35 of relay valve 36 through conduits 37 and 38. Conduit 39 which is also in communication with conduit 37 is dead ended at control valve 16, as will become more apparent hereafter. The evacuation of chamber 35 of relay valve 36 against the venting provided by bleed 40 will cause diaphragm 41 to move upwardly against the bias of spring 42. This action will in turn cause the raising of valve stem 43 and move poppet valve 44 from its lower seat 45 to its upper seat 46. The unseating of valve 44 in this manner will permit the vacuum in conduit 17, which is in communication with conduit 47, to evacuate conduit 48 through chamber 49. Conduit 48 in turn communicates with conduits 50 in communication with chambers 51 of door locking motors 52 in the vehicle operator's door, the door next to it, and the right rear passenger's door. The evacuation of the door locking motors 52 in the above-described manner causes diaphragm 53 therein to move downwardly and cause a corresponding downward movement of shafts 54 which are coupled to the latch locks 55, and thereby cause these latch locks to assume a locked condition, as will be described in greater detail hereafter.

The manual manipulation of control knob 24 in the above-described manner will also cause manual remote locking of latch lock 55' in the right front passenger's door because conduit 48 is in communication with conduit 56 on nipple 57 of manual control valve 19. Since conduit 48 is placed in communication with the source of vacuum as described above, chamber 51' of motor 52' will also be evacuated because conduit 58 is in communication with conduit 56 through nipple 57, valve chamber 58', valve chamber 59, and nipple 60. It is to be noted that valve 32 permits communication between chambers 58 and 59 under circumstances when pin 25 has been moved to the left.

When knob 24 has been released, springs 23 and 33 will expand to return control valve 19 to the position shown in the drawing. At this time conduit 17' will no longer be in communication with conduit 37 and chamber 35 of relay valve 36 will be vented to the atmosphere through vent 40, whereupon spring 42 will return valve 44 to the position shown in the drawings, thereby terminating communication between conduit 47 coming from the vacuum source and conduit 48 leading to the door locking motors. After valve 44 has returned to the position shown in FIG. 2, conduit 48 leading to the door locking motors will be vented to the atmosphere through valve aperture 61, filter 62, valve chamber 63, the space surrounding valve stem 41, and chamber 49. Thus the door latch locks may be manipulated to effect unlatching of the vehicle doors without interference from any force provided by motors 52 and 52'.

The right front passenger's door may be unlocked by pulling knob 24 to the right to thereby permit a passenger to enter the vehicle. This remote manual unlocking is not dependent on any source of power within the vehicle, such as the intake manifold used for remote locking. More specifically, control 19 includes a pump for providing compressed air. When knob 24 is moved to the right, stem 28 will move to the right also and carry piston 64 to the right against the bias of spring 65, thereby tending to compress the air in pump chamber 66 and force it through conduits 67 and 68, thereby unseating check valve 69 against the bias of spring 70. The air thus compressed will move into chamber 71. Since stem 25 has been moved to the right, spring 72 will expand and pin 30 will move gland valve 73, which is loosely mounted on pin 25, to a position wherein it closes vent 74 and the compressed air will thus enter chamber 59 and from chamber 59 into conduit 58 which is in communication with chamber 51' of the right front passenger's door locking motor 52'. This will cause motor 52' to provide a movement for unlocking the vehicle door. It is to be noted that the compressed air is passed through the same single conduit 58 which was previously used for transmitting vacuum to chamber 51'. It is to be further noted that after pin 30 has moved to the right, as described above, to seat valve 73, spring 33 will expand and cause the seating of valve 32. Valve 32, when seated, prevents chamber 59 from being vented to the atmosphere through conduit 56 and relay valve 36. Valve 32 also acts as a safety valve so that if the pressure in line 58 should exceed a predetermined value, valve 32 will unseat and permit the pressure to be dissipated through conduit 56, chamber 49, chamber 63, filter 62, and vent aperture 61. The pressure actually can be built up in chamber 66 by the pump because repeated strokes may be effected by the pump to build up the pressure in conduit 58, if for some reason a single stroke is ineffective for doing so. More specifically, a check valve 75 is mounted on piston 64, and after knob 24 is released after a stroke on piston 64 has been effected to the right, spring 65 will expand and return piston 64 to the position shown in the drawing. During this movement check valve 75 unseats. Thereafter a repeated movement of piston 64 to the right will cause check valve 75 to close, thereby trapping air in chamber 66 which is subsequently compressed. A vent 76 is provided in the housing of control 19 to permit atmospheric air to enter chamber 66 during movement of piston 64 to the left. After door locking has been effected in the foregoing manner and piston 64 returns to the position shown in FIG. 2, chamber 51' of motor 52' is vented to the atmosphere through conduit 58, valve chamber 59, valve chamber 58', conduit 56, and relay valve 36 which occupies the position shown in FIG. 2, as described above.

The instant system also provides for automatic locking of all the vehicle door locks while the vehicle is in motion, and for causing the door locking motors 52 and 52' to maintain a holding force on the door locks while the vehicle is in motion to thereby prevent accidental door openings from within the vehicle. In this respect control 16 is operatively associated with the speedometer cable drive of the vehicle. This aspect of the present invention may be identical to the subject matter disclosed in application Serial No. 70,320 filed November 18, 1960, and now Patent No. 3,042,135. Only the barest essentials of the foregoing filed application are deemed necessary for a description of the present subject matter. More specifically, control 16 includes a fitting which engages the vehicle transmission in lieu of the speedometer cable take-off which is removed to permit such installation. The speedometer cable is thereafter mounted on control 16. The speedometer take-off from the transmission drives shaft 77 to which rotary valve 78 is attached. Valve 78 rotates on valve seat 79 in which apertures 80, 81, 82, and 83 are located. Grooves 84 and 85 selectively bridge various of the apertures 80, 81, 82, and 83. When valve 78 is in the position shown in the drawing, the intake manifold will communicate with chamber 86 of control 16, chamber 86 being defined by housing portion 87 and flexible diaphragm 88. More specifically, this communication is effected through conduit 15, nipple 89, aperture 81, groove 84, aperture 80, and conduit 90 in valve 16. When chamber 86 is thus evacuated, flexible diaphragm 88 will tend to deflect out of the plane of the drawing to thereby tend to create a rarefied or evacuated condition in chamber 91 which is defined by housing portion 92 and the other side of diaphragm 88. It will be appreciated that diaphragm 88 is sandwiched between housing halves 87 and 92 by rivets 93 which hold the housing halves together. When diaphragm 88 is deflected upwardly as a result of the evacuation of chamber 86, there will be a tendency to evacuate chamber 35 of relay valve 36 through conduit 38, conduit 39, nipple 94, aperture 83, groove 85, aperture 82, and valve conduit 95. After valve 78 has turned one quarter of a turn clockwise so that groove 84 bridges apertures 80 and 83 and groove 85 bridges apertures 82 and 81, chamber 91 will be evacuated by the vacuum source, and chamber 86 will be in communication with chamber 35 of relay valve 36. Thus control 16 will again tend to evacuate chamber 35. As valve 78 rotates in response to the rotation of the speedometer cable, vacuum impulses will be continually supplied to chamber 35 against the venting effect provided by vent 40 in communication with chamber 35. All the while that these vacuum impulses are being supplied, diaphragm 41 of relay valve 36 will be pulled upwardly against the bias of spring 42 to permit communication between conduit 47 leading from the intake manifold 12 and conduit 48 leading to the door locking motors. When the vehicle ceases to move, control 16 will no longer provide vacuum impulses to chamber 35 of relay valve 36 and vent 40 will permit diaphragm 41 to return to the position shown in the drawing, whereupon motor chambers 51 and 51' will be vented to permit the vehicle doors to be unlatched from within the vehicle. In short, the alternate evacuation of chambers 86 and 92 and the simultaneous placing of the other of these chambers in communication with chamber 35 as a result of the rotation of valve 78 thus provides the series of vacuum impulses which hold valve 44 open against the bias of spring 42; and it is in this manner that speedometer drive is utilized to provide the intelligence as to whether the vehicle is moving or at a standstill.

As long as the vehicle remains moving, the intake manifold will be in communication with the door locking motors to thereby cause the latter to exert a locking force on the door locks. It is this locking force which opposes the force applied to the door unlocking mechanism within the vehicle, and thus prevents the doors from being unlatched from within the vehicle while the vehicle is in motion.

It is to be especially noted that the fluid flow through relay valve 36 is the same when this valve is actuated by control 16 or when it is actuated by pressing control knob 24 of control 19 to the left, as described in detail above.

It is to be especially noted that the vehicle door or doors which are susceptible of being unlocked by pulling knob 24 of control 19 to the right, as described in detail above, cannot be so unlocked while the vehicle is in motion, thereby preventing inadvertent door latch actuations. More specifically, when conduit 56 is in communication with the vacuum source (when valve 44 is unseated from its lower seat 45) the existence of vacuum in chamber 59 will cause gland valve 73 to be seated on its seat as shown. Thus if knob 24 should be pulled to the right, the tendency will be for air in chamber 66 to flow through conduit 68, past check valve 69, into chamber 71, through vent 74, which is opened, because plug 74', which is slidably mounted on pin 25, has moved to the right as a result of the air pressure in chamber 71, and then exhausted through vent 76 to the atmosphere. Gland valve 73 will remain seated against the bias exerted by spring 72 when stem 25 is moved to the right. Thus since the air compressed in chamber 66 cannot be transmitted to door locking motor 52' when the vehicle is moving, there can be no inadvertent unlatching of the right passenger's door due to an inadvertent actuation of control 19.

Latch locks 55 and 55' operate in the following manner: A bell crank lever 55'' is pivotally mounted on housing 56' by a pin 57'. The shaft 58' of a conventional manual door locking and unlocking pin 59' extends through the molding (not shown) of the vehicle door. Shaft 58' is fastened to one end of bell crank lever 60' (FIGS. 2 and 3) which is adapted to pivot about pin 61', the other end of lever 60' fitting within notched recess 62' of link 63'. Link 63' is pivotally mounted on pin 64' which extends from flange 65' positioned at a right angle to plate 66' of housing 56'. As can be seen from FIG. 3, when shaft 58' is depressed, link 63' will pivot in a clockwise direction about its pivot pin 64' to cause the portion 67' of the link 63' to move downwardly and carry prong 68' downwardly with it, prong 68' fitting within the slotted portion 70' of link 63'. It will be noted that a snap-acting spring 71' (FIG. 3) has one end 72' anchored on flange 65' and the other end 73' anchored in link 63'. Thus when manual locking pin 59 is depressed to a locked condition (either manually or by the action of the door locking motor), it is the snap spring 71' which maintains link 63' in a locked position after the locking force provided by the door locking motor is removed.

Shaft 54' of fluid pressure motor 52' is coupled to shaft 74' which is in turn coupled to bell crank lever 60'. Thus the downward movement of motor shaft 54' in response to the existence of vacuum in motor chamber 51' will cause the same action caused by the downward movement of shaft 58, namely, a downward movement of the leg of bell crank lever 60' to thereby pivot link 63' to a locked position, as shown in FIG. 3.

After link 69' has been pivoted in a counterclockwise direction about pivot pin 75' due to the fact that the pivoting movement of pivot link 63' moved prong 68' of link 69' downwardly, the movement of pin 76' to the left, as occurs when the outside door handle or button 76'' is manipulated, will cause lever 77' to pivot counterclockwise about pin 78' and cause link 69' (attached to lever 77' by pin 75') to move to the left in FIG. 2. However, the end 78' of link 69' will not engage flange 79' of bell crank lever 55''. Thus the manipulation of the outside door handle will be ineffective for unlocking the door because the movement of link 69' will not cause lever 55' to pivot in a counterclockwise direction to free latch 80', as described in detail hereafter.

It is only after link 69' has been pivoted about pin 75' in a clockwise direction from its position shown in FIG. 2, as a result of either the pressurizing of motor chambers 51' (or 51) or the upward movement of pin 59' that the end 78' may engage flange 79' when the outside door handle is manipulated. After end 78' of link 69' engages flange 79' of bell crank lever 55" in response to the movement of pin 76' to the left during a door unlatching operation, lever 55" will pivot in a counterclockwise direction about pin 57' and the leg 81' (of lever 55") which is within the recessed portion 82' of lever 83' will cause the latter to pivot in a clockwise direction about its pivot pin 84' against the bias of spring 85'. This in turn will cause the tongue 86' of lever 83' to cease engagement with ratchet wheel 87' which is, in turn, coaxially mounted on shaft 88' with the rotary door latch 80. When the above-described locking arrangement for the rotary door latch 80 is released through the operation of the above-described linkage, as a result of the actuation of button 76", latch 80' is free to move relative to the striker plate (not shown) on the door jamb to permit the vehicle door to be pulled to an open position.

From the foregoing description it will readily be appreciated that whenever any of the motor chambers 51' or 51 are evacuated, the diaphragms 53 or 53' will pull motor shafts 54 or 54' downwardly, thereby effecting locking of the latch locks 55'. Furthermore, whenever the manual control 19' is actuated to provide compressed air to be transmitted to chamber 51' of motor 52' through the single conduit 58', motor shaft 54' will be moved upwardly to cause latch lock 55' to assume an unlocked condition.

As noted above, when the latch locking motors are being subjected to the influence of vacuum from the vacuum source, the resistance offered by the door locking motors will prevent the latch locks from being unlatched from within the vehicle. However, when the door locking motors are vented in the manner described above as a result of the automatic action of relay valve 36, the door locking force provided by the door locking motors will be removed to permit the door locks to be unlatched from within the vehicle. Furthermore, because of the action of over center spring 71' (FIG. 3) once the door locks have been actuated to a latched condition as a result of placing the door locking motors in communication with the source of vacuum, they will remain in a locked condition after the locking force provided by the motors is removed. Thus while the latch locks may be unlatched from within the vehicle after the door locking motors are vented, the fact remains that the manipulation of the outside door unlocking buttons 76" will be ineffective for unlocking the latch locks, thereby protecting the vehicle occupants against unauthorized intrusion.

The rear door latch locks 55 possess the selective freewheeling features set forth in Patent No. 2,849,251 which renders the inside door handles 100 ineffective for unlatching the latch lock when the door locking pins 59' are depressed. Furthermore, while the vehicle is rolling, the force of the door locking motors 52 and 52' exerted on door locking pins 59' will prevent these pins from being lifted upwardly to render the freewheeling feature ineffective. The front doors may have the selective freewheeling feature noted above or, if desired, may incorporate the feature wherein the handles 101 are coupled to links 102 which, in turn, are connected to levers 103 (FIG. 2) so that the movement of link 102 out of the plane of the drawing will cause the top of lever 103 to pivot into the plane of the drawing about pin 104 and cause bell crank lever 55" to pivot counterclockwise to unlatch the vehicle doors.

In FIG. 4 an alternate embodiment of the present invention is disclosed. This embodiment is essentially the same as that disclosed in FIGS. 1 to 3 except for the fact that the manual remote unlocking action unlocks all four doors instead of only the right front passenger's door. More specifically, valve 19 of FIG. 4 is identical to valve 19 of FIG. 2; and relay valve 36 is identical to relay valve 36 of FIG. 2. The difference between FIGS. 2 and 4 resides in the fact that conduit 48 in FIG. 4 is connected to the door locking motors 52 through control 19, whereas in FIG. 2 motors 52 are connected to relay valve 36 directly. It can thus be seen that while motors 52 of FIG. 4 are automatically or selectively remotely evacuated to effect the locking action thereof, when remote manual unlocking is effected by moving knob 24 to the right, the compressed air produced by the pump portion of control 19 is forced into conduit 58 which is in communication with all of the motors 52 through the single conduit connection to each of said door locking motors. It will readily be appreciated that the manual remote unlocking action may thus be applied to only one door as shown in FIG. 2, to all the doors as shown in FIG. 4, or to only a select number of doors which is less than the total number of doors in the vehicle.

While the disclosed embodiments of the invention have been shown as being actuated directly from the engine intake manifold, it will readily be appreciated that if desired a vacuum tank may be utilized to provide a stored source of vacuum, the vacuum tank being selectively evacuated during operation of the intake manifold in a manner which is well known in the art. It will also be appreciated that the above system can be modified so that a source of compressed air is used to effect locking and the pump portion of single control 19 may be modified to provide vacuum, instead of positive pressure, for unlocking.

While preferred embodiments of the present invention have thus been disclosed, it is to be understood that the present invention is not to be limited thereto, but may be otherwise embodied within the scope of the following claims.

What is claimed is:

1. A door locking system for an automotive vehicle comprising a door in said vehicle, a latch lock operatively associated with said door, a fluid pressure motor, linkage means coupling said fluid pressure motor to said latch lock, a source of fluid pressure in said vehicle, first control means for automatically causing said source of fluid pressure to communicate with said fluid pressure motor to thereby effect locking of said latch lock solely in response to the movement of said vehicle, and second control means manually actuable in a first direction for effecting communication between said source of fluid pressure and said door locking motor to thereby effect manual remote locking of said latch lock when said vehicle is at a standstill, said second control means including self-contained pump means independent of said source of fluid pressure manually actuable in a second direction to produce pressurized fluid which is opposite in sign to the fluid under pressure at said source to thereby actuate said fluid pressure motor in a second direction which is opposite to said first direction to thereby effect remote unlocking of said latch lock.

2. A door locking system for an automotive vehicle comprising a door in said vehicle, a latch lock operatively associated with said door, a fluid pressure motor, linkage means coupling said fluid pressure motor to said latch lock, a source of fluid pressure in said vehicle, conduit means including a single conduit in communication with said fluid pressure motor for effecting communication between said source of fluid pressure and said fluid pressure motor, first control means for automatically causing said source of fluid pressure to communicate with said door locking motor through said single conduit means to thereby effect locking of said latch lock solely in response to the movement of said vehicle, and second control means manually actuable in a first direction for permitting communication between said source of fluid pressure and said door locking motor through said single conduit means to thereby effect manual remote locking of said latch lock when said vehicle is at a standstill, said second control means including self-contained pump means independent of said source of fluid pressure manually actuable in a second direction to produce pressurized fluid which is opposite in sign to the fluid under pressure at said source, and means for causing said pressurized fluid of opposite sign to communicate with said fluid pressure motor through said single conduit to cause said fluid pressure motor to be actuated in a second direction which is opposite to said first direction to thereby effect remote unlocking of said latch lock.

3. A door locking system for an automotive vehicle comprising a plurality of doors in said vehicle, a latch lock operatively associated with each of said doors, a fluid pressure motor for each of said latch locks, linkage means coupling each fluid pressure motor to a respective latch lock with which it is associated, a source of fluid pressure in said vehicle, first control means for automatically causing said source of fluid pressure to communicate with said door locking motors to thereby effect locking of all of said latch locks solely in response to movement of said vehicle, and second control means manually actuable in a first direction for permitting communication between said source of fluid pressure and said door locking motors to thereby effect manual remote locking of said latch locks when said vehicle is at a standstill, said second control means including self-contained pump means independent of said source of fluid pressure manually actuable in a second direction to produce pressurized fluid which is opposite in sign to the fluid under pressure at said source, and means for causing said pressurized fluid of opposite sign to be conducted to certain of said fluid pressure motors but not to others, thereby actuating said fluid pressure motors to which said fluid under pressure is conducted in a second direction which is opposite to said first direction to thereby effect remote unlocking of said certain of said latch locks.

4. A door locking system for an automotive vehicle comprising a plurality of doors in said vehicle, a latch lock operatively associated with each of said doors, a fluid pressure motor for each of said latch locks, linkage means coupling each fluid pressure motor to its respective latch lock, a source of fluid pressure in said vehicle, conduit means including a single conduit in communication with each of said fluid pressure motors for effecting communication between said fluid source and said fluid pressure motors, first control means for automatically causing said source of fluid pressure to communicate with each of said door locking motors through said single conduits to thereby effect locking of said latch locks solely in response to the movement of said vehicle, and second control means manually actuable in a first direction for effecting communication between said source of fluid pressure and each of said door locking motors through said single conduits to thereby effect manual remote locking of said latch locks when said vehicle is at a standstill, said second control means including self-contained pump means independent of said source of fluid pressure manually actuable in a second direction to produce pressurized fluid which is opposite in sign to the fluid under pressure at said source, and means for causing said pressurized fluid of opposite sign to communicate with at least one of said fluid pressure motors through the single conduits associated therewith but not with others to thereby actuate said at least one of said motors in a second direction which is opposite to said first direction to thereby cause said at least one of said motors to effect unlocking of the latch locks with which it is associated.

5. A door locking system for an automotive vehicle comprising a plurality of doors in said vehicle, a latch lock operatively associated with each of said doors, a fluid pressure motor operatively coupled to each of said latch locks, a source of fluid pressure in said vehicle, first control means for automatically causing said source of fluid pressure to communicate with certain of said fluid pressure motors to thereby effect locking of said latch locks coupled to said certain of said fluid pressure motors in response to movement of said vehicle, a single control in said vehicle, conduit means operatively coupled between said source of fluid pressure and another of said fluid pressure motors through first valve means in said single control whereby actuation of said first control means results in actuation of said other fluid pressure motor to cause locking of the latch lock associated therewith, manually actuable means forming part of said single control adapted to be actuated in a first direction for effecting communication between said source of fluid pressure and certain of said door locking motors through second valve means when said vehicle is not moving, said manually actuable means also effecting actuation of said other of said fluid pressure motors through said first valve means to thereby effect remote manual actuation of all of said fluid pressure motors to a locking condition, and a fluid pressure pump forming a part of said single control adapted to provide fluid pressure which is opposite to the fluid pressure at said source when said manual means are actuated in a second direction which is opposite to said first direction, and linkage means operatively coupled between said manual means and said first valve means for causing said first valve means to move from a position where it routes said fluid pressure from said source to said other of said door locking motors to a position wherein it routes said opposite fluid pressure to said other of said door locking motors to cause said other of said door locking motors to be actuated in a direction which is opposite to the direction in which it was actuated from said source of fluid pressure to thereby effect manual remote unlocking of the latch lock associated with the other of said fluid pressure motors.

6. A door locking system as set forth in claim 5 including third valve means operable when said other of said fluid pressure motors is in communication with said source of fluid pressure for preventing said pump means, when actuated, from providing said opposite fluid pressure to said other of said fluid pressure motors, thereby preventing manual remote unlocking of the latch lock associated with said other of said fluid pressure motors while said first control means causes automatic actuation of said other of said fluid pressure motors while said vehicle is in operation.

7. A door locking system for an automotive vehicle comprising a door in said vehicle, lock means operatively associated with said door, motor means operatively associated with said lock means, first control means for causing said motor means to effect locking of said lock means in response to movement of said vehicle, second manually actuatable control means for effecting remote actuation of said motor means for effecting unlocking of said lock means, and third control means operatively associated with said second control means for preventing said second control means from effecting remote unlocking of said lock means while said vehicle is in motion.

8. A vehicle door locking system comprising a door in said vehicle, lock means operatively associated with said door, motor means operatively associated with said lock means, a source of fluid pressure in said vehicle, single conduit means for effecting communication between said source of fluid pressure and said motor means, control means operative solely in response to movement of said vehicle for effecting said communication between said source of fluid pressure and said motor means to thereby automatically effect locking of said door lock and to prevent unlocking thereof when said vehicle is in motion, and means associated with said control means for terminating said communication between said source of fluid pressure and said lock means in response to cessation of movement of said vehicle to permit said lock means to be unlocked from within said vehicle, manually actuatable control means operatively associated with said single conduit means for effecting remote actuation of said motor means through said single conduit means to thereby effect remote locking of said lock means, and self-contained pump means operatively associated with said manually actuatable control means for providing fluid pressure which is opposite to said fluid pressure at said source to thereby effect actuation of said motor means through said single conduit means for effecting remote unlocking of said lock means.

References Cited by the Examiner
UNITED STATES PATENTS

| | | | |
|---|---|---|---|
| 2,198,862 | 4/40 | Chesler. | |
| 2,221,044 | 11/40 | Dimick. | |
| 2,530,628 | 11/50 | Pivero | 70—264 X |
| 2,535,574 | 12/50 | Hill. | |
| 2,936,843 | 5/60 | Adams et al. | 180—82 |
| 2,941,614 | 6/60 | Forbush et al. | 180—82 |
| 3,019,848 | 2/62 | Garvey et al. | 180—82 |
| 3,039,555 | 6/62 | Oshei et al. | 180—82 |
| 3,042,135 | 7/62 | Riester | 180—82 |
| 3,070,184 | 12/62 | Riester | 180—82 |
| 3,111,184 | 11/63 | Oishei | 180—82 |

A. HARRY LEVY, *Primary Examiner.*

ALBERT H. KAMPE, PHILIP ARNOLD, *Examiners.*